United States Patent [19]
Chottiner

[11] 4,152,489
[45] May 1, 1979

[54] MULTI-PLY LAMINAR PASTED AIR ELECTRODES

[75] Inventor: Jacob Chottiner, McKeesport, Pa.

[73] Assignee: Westinghouse Electric Corp., Pittsburgh, Pa.

[21] Appl. No.: 828,058

[22] Filed: Aug. 26, 1977

[51] Int. Cl.² .............................................. H01M 4/86
[52] U.S. Cl. ......................................... 429/27; 429/44
[58] Field of Search ...................... 429/27, 44, 28, 29, 429/40

[56] References Cited

U.S. PATENT DOCUMENTS

| | | | |
|---|---|---|---|
| 3,457,113 | 7/1969 | Deibert | 429/44 |
| 3,513,029 | 5/1970 | Giner et al. | 429/44 |
| 3,515,595 | 6/1970 | Sanford | 429/44 |
| 3,592,695 | 7/1971 | Moran | 429/27 |
| 3,840,407 | 10/1974 | Yao | 429/27 |
| 3,930,094 | 12/1975 | Sampson et al. | 429/42 X |
| 3,977,901 | 8/1976 | Buzzelli | 429/40 |

Primary Examiner—Donald L. Walton
Attorney, Agent, or Firm—D. P. Cillo

[57] ABSTRACT

An air electrode, for use in electrochemical energy cells, is made, comprising a multi-layer hydrophilic section, consisting of at least two substantially uncompacted laminated layers of plaques containing loaded, catalytically active battery material; each loaded plaque consisting of a 75% porous to 95% porous metal current collector, having between about 45% to about 95% of its pore volume filled with the active material, where the weight ratio of active material:plaque current collector in the laminated layers is between 0.40:1 and 2.80:1.

13 Claims, 3 Drawing Figures

MULTI-PLY LAMINAR PASTED AIR ELECTRODES

BACKGROUND OF THE INVENTION

Bifunctional air electrodes for an iron-air battery generally consist of three components. These are a hydrophobic membrane which permits air passage while retaining electrolyte, a single, fiber metal, nickel plaque, which serves as current collector and conductor and as a holder of a catalytic active material paste, and the catalytic active material paste composite itself, which is attached and pressed onto the current collector.

Such as iron-air battery is taught by Buzzelli, in U.S. Pat. No. 3,977,901. There, a polytetrafluoroethylene hydrophobic membrane was laminated to a single, 45 mil thick, 94 percent porous, sintered, nickel fiber current collector, which had an active material comprising acetylene black carbon and tungsten disulfide catalyst compact pasted onto its surface.

Due to the relative high viscosity of the active material paste, it has been necessary to apply considerable force during the pasting operation, in order to get reasonable loading. This force generally tends to compress and compact the sintered, fiber metal plaque structure, to provide only about a 40% to 65% porous plaque, and prevents the paste from filling all of the original plaque pores or voids. Loading generally ranges from about 15% to 35%; and electrode life, to 300 mV. below Hg/HgO, for single ply 45 mil thick plaques, having about 25 mg/sq. cm. loading, is about 615 hours.

The ideal incorporation of the catalytic paste into the plaque would be to have about 95% to 100% of the plaque pores filled. This would produce the highest number of active sites within the confines of the plaque, with all active sites very close to the metal current collecting fibers. It is also advantageous to have most of the active material within the plaque, rather than forming a separate composite layer held or attached to the plaque structure. Thick coatings of catalytic paste on the surface of the plaque result in many of the active sites being far removed from the nickel fibers, with electrons from these sites having to traverse a high resistance path to reach the current collector.

What is needed is an uncompacted air electrode that permits maximum catalytic paste loading and minimum resistance paths between active sites and current collecting and conducting fibers.

SUMMARY OF THE INVENTION

The above problems were solved, and the above needs met, by providing a substantially uncompacted air electrode having a laminar structure, consisting of an optional hydrophobic layer, and at least two, bonded, catalytically pasted active layers. Each active layer consists of an uncompacted, expanded metal, or preferably a fiber metal plaque current collector, loaded with active battery material. The plaque current collector has a theoretical density of between about 5% and about 25%, i.e., it is about 75% to 95% porous, and a thickness of between about 0.005 inch to about 0.050 inch. The weight ratio of catalytic active material:-plaque must be between 0.40:1.0 and 2.80:1.0.

The plaques contain the catalytic active material primarily within its uncompressed structure, and have an active material loading of between about 45% to about 95%, i.e., between about 45% to about 95% of the pore or void volume in the porous fiber plaque structure is filled with catalytic active material. Thus, when these catalytically pasted, highly filled active layers are bonded together, usually at about 0.25 ton to 7.5 tons per square inch pressure, at about 200° C. to 350° C.; the resulting laminar electrode is very highly loaded with active battery material, and has only a very minimum of attached composite active material outside of the plaque structure.

These air electrodes provide minimum resistance paths between active sites and current collecting fibers, and give improved life and polarization characteristics.

BRIEF DESCRIPTION OF THE DRAWINGS

For a better understanding of the invention, reference may be made to the preferred embodiments, exemplary of the invention, shown in the accompanying drawings in which.

PREFERRED EMBODIMENTS OF THE INVENTION

Figure 1:
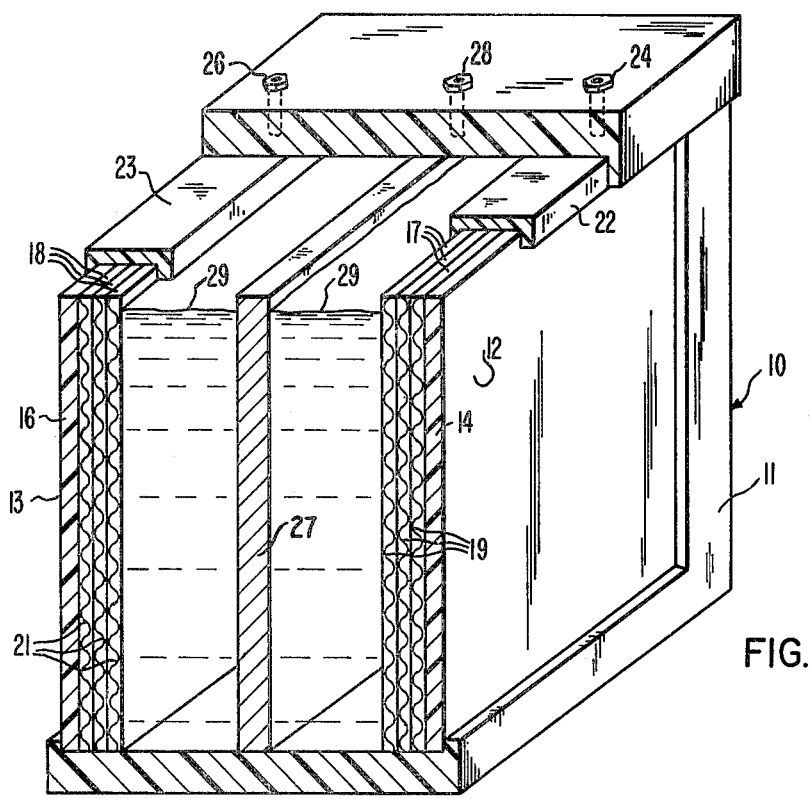
FIG. 1 is an isometric view, in partial section of one type of an air/metal battery of the present invention.

Referring now to FIG. 1, the battery 10 is a general representation of the bifunctional and unifunctional metal/air cells of the present invention. Metal/air cell 10 includes a casing 11 for support of the air electrode and fuel electrode as well as the electrolyte. Preferably, casing 11 is fabricated from ABS plastic or other non-conducting material that is stable or resistant to the electrolyte and reaction products, typically oxygen and hydrogen. Cell 10 comprises a pair of air cathodes 12 and 13 each having an optional outer hydrophobic layer 14 and 16, respectively, each of which may be in contact with the atmosphere or other source of air or oxygen. Air electrodes 12 and 13 also include hydrophilic sections 17 and 18, respectively, each hydrophilic section consisting of a plurality of thin, laminated, active material loaded plaques. These sections include integral metal current collectors 19 and 21. Electrodes 12 and 13 are framed in frames 22 and 23, preferably made from ABS plastic and having electrical leads 24 and 26, respectively.

Metal/air cell 10 includes a fuel electrode 27, fabricated from iron, cadmium, zinc or the like material, preferably iron, spaced between air electrodes 12 and 13 and including electrical lead 28. Metal/air cell 10 also includes an electrolyte 29 between and in contact with metal electrode 27 and air electrodes 12 and 13, respectively. Electrolyte 29 comprises an alkali hydroxide, preferably potassium hydroxide.

Figure 2:
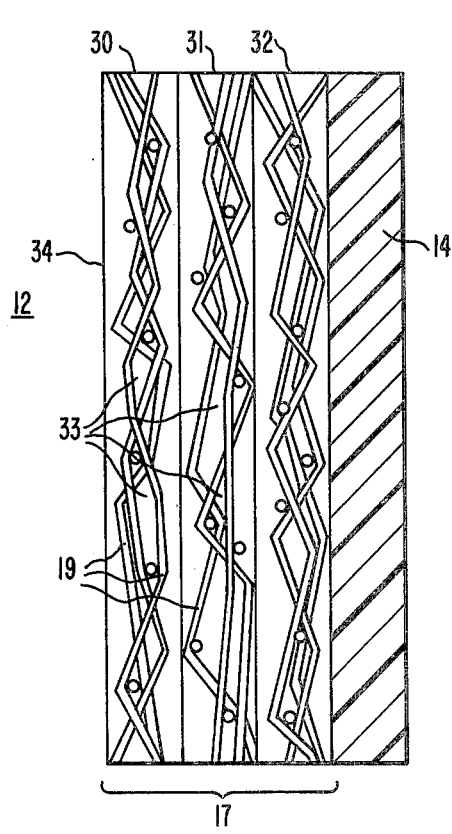
FIG. 2 is an enlarged sectional elevation of one embodiment of the air cathode of the present invention, showing separate laminated electrode components.

FIG. 2 shows in detail the air electrode 12 of FIG. 1. As can be seen, the electrode is of a laminar construction. Air cathode 12 is shown with hydrophilic section 17 and the optional hydrophobic layer 14 laminated thereto. Current collector fibers 19 are shown in the hydrophilic section 17 and are adapted for electrical connection to the circuit.

The plaque current collector can be made of expanded metal, such as nickel, cobalt, magnesium, gold, silver or chromium. It can also be made from coated iron or steel, or uncoated iron or steel. Preferably, it is made from nickel, cobalt, magnesium, gold, silver or chromium coated iron or steel fiber metal; or uncoated iron or steel fiber metal, such as, for example, steel wool. The plaque should have a porosity of about 75% to 95% and a thickness of between about 0.005 inch to about 0.050 inch. In the present invention, the hydrophilic section 17 is about 10 to 150 mils (0.010 inch to 0.150 inch) and preferably about 10 to 75 mils in thickness, containing two or more separate loaded plaques.

FIG. 2 shows a three ply structure with the plaques shown as 30, 31 and 32. The optional hydrophobic layer 14 is about 5 to 20 mils thick. Generally, it has been found that the life of air electrodes increases with an increase in the thickness of the hydrophilic section; however, any increase greater than about 150 mils is undesirable, because of the increase in weight to the cell, unless there is a corresponding greater increase in power output obtained.

The hydrophilic plaques, 30, 31 and 32, comprising the hydrophilic section 17, are preferably hot press laminated together after pasting, to form a consolidated laminar structure. Pressing is at between about 0.25 ton to 7.5 tons per square inch, at about 200° C. to 350° C. for about 1 minute to about 20 minutes. In this invention, all of the active material is retained substantially within each plaque structure, and so, the plaque structure remains uncompressed, as shown at 33. As can be seen, the fibers are substantially uncompacted, i.e. they retain almost all of the active battery material within their void volume and substantially retain at least about as much porosity as they started with, i.e. about 75%, before lamination.

As can be seen, using this thin plaque construction, the catalytically pasted active plaque layers 30, 31 and 32 have active material 33 intimately in contact with and completely surrounding the uncompressed metal fiber current collectors 19, filling a large portion of the hydrophilic section, i.e., between about 45% to 95% of the pore or void volume in the porous plaque structure. The hydrophilic section is free of any large voids and does not contain a separate, thick, attached, active material layer at 34, on the hydrophilic side of the air electrode.

This combination plaque structure allows an initial complete loading of each thin plaque. It is very important that when the loaded plaques are laminated together, the hot pressing is effective to bond the plaques into a unitary consolidated structure, but not to substantially compress the plaque structures. This process will produce the highest number of active sites close to the metal current collecting fibers. It is to be understood that FIG. 2 is not limiting, and that hydrophilic section 17 can comprise from 2 to about 15, preferably 3 to 8, separate plaques bonded together. It is necessary to have at least 2 layers in order to get improved lifetimes for the air electrodes.

In each loaded plaque, the weight ratio of catalytic active material to plaque structure, i.e., current collector, must be between about 0.40 to 1.0 and 2.80 to 1.0. These are critical ratios. Values under 0.40 to 1, i.e., less than 0.40, will provide electrodes having a relatively low active lifetime in terms of time and number of useful cycles. Values over 2.80 to 1.0 would provide a situation where it would be difficult to load the plaques.

The current collectors 19, of each plaque 30, 31 and 32, may be expanded metal, a fibrous wire mesh metal member, but preferably are diffusion bonded nickel coated steel wool fibers. Extra fine, commercially, available steel wool is found to be an economical material for the electrode plaque construction of this invention. One suitable material is grade 000 steel wool, which is available in the form of a long sheet of generally parallel, intermingled, substantially unidirectional fibers which averages approximately 0.25 inch in thickness. In this invention, the fibers should have a thickness of below about 0.050 inch. These intermingled fibers are relatively smooth and exceed 1.5 inches in length, being essentially continuous for the entire length of the electrode plaque. Excellent results has been had with steel wool fibers about 1.5 inches long having a diameter ranging from 0.0002 inch to 0.0136 inch. The average diameter of the 000 grade of steel wool fibers is 0.0008 inches.

The steel wool is basically a low carbon steel, but the plaque may comprise nearly pure iron. The steel wool can be coated with nickel, copper, etc. This must be done prior to diffusion bonding, so as not to interfere with the fiber bonding process. Of course, uncoated nickel fiber plaques can also be used. The generally parallel fibers of each plaque and pressed to insure physical contact and metallurgically bonded together so as to produce plaques having a uniform density. The temperature that can theoretically be used in diffusion bonding ranges up to the melting point of the fibers used. The fibers must not be melted together or the pore volume of the plaque will be full of iron globules. Practically, the temperature should range from about 800° C. to about 1,300° C.

The atmosphere used during diffusion bonding to prevent oxidation of the fibers should be inert and/or protective, as for example, argon, hydrogen, nitrogen, helium and dissociated ammonia. The density of the plaque for good results (maximum loading of active material) must be between 5 to 25 percent of theoretical density (i.e., 75 to 95 percent porosity). Various methods can be used to achieve this density. For example, the steel wool weight and surface area can be determined. During bonding a weight can be placed on the sheets causing them to assume a more dense form, so that a desired thickness can be attained.

The optional hydrophobic layer 14 is preferably about 5 to 20 mils thick, and can comprise a sheet of porous, unsintered, completely fibrillated polytetrafluoroethylene alone or in combination with polymethylmethacrylate and plasticizers such as dialkyl phthalate. Preferably, the hydrophobic layer, when used, will comprise a sheet of porous unfibrillated fluorinated ethylene propylene, and fibrillated polytetrafluoroethylene and polypropylene fibers. While other methods of attaching hydrophobic layers 14 and 16 to hydrophilic layers 17 and 18 are suitable, it is preferred that they be roll laminated. Both layers are passed through a mill wherein the roll surfaces are maintained at a temperature of about 190° C. with an air pressure of between about 25 psi and 500 psi. These non-wettable, air permeable, bondable hydrophobic mats are well known in the art and reference may be made to U.S. Pat. No. 3,930,094 for a detailed description of their fabrication.

The pasted catalytic active material can be composed of particles of a carbonaceous material selected from the group consisting of carbon, graphite, boron carbide, and mixtures thereof. When carbon is used as the conducting material, the particles should have a surface area of from about 30 to 1,500 square meters per gram. In addition, the active material can include a binder inert to the electrolyte, for example, polymers and copolymers of polysulfone resin, polyethylene resin, polypropylene resin, fluorinated ethylene propylene resin or a fluorocarbon, such as polytetrafluoroethylene or chloro-fluorinated hydrocarbon polymer, that binds the particles of conducting material together in a porous manner. The amount of binder may vary from about 10 to 50 weight percent of the total composition, with a preferred range of from about 20 to 50 weight percent. In addition, the catalytic active material can include a suitable catalyst which would contain at least one of the metals of a group consisting of the platinum group metals (Pt, Ir, Ru, Rh, Pd), mercury, gold and silver.

Particularly useful active materials are described in U.S. Pat. No. 3,977,901. These include oxygen absorption/reduction carbon particles, such as acetylene black carbon; about 0.25 part to about 4 parts/part carbon of a low oxygen overvoltage material, such as at least one of $CuWO_4$, $NiWO_4$, $CoWO_4$, $WS_2$, WC and WC fuse coated with 1 to 20 wt.% Co; an effective amount of bonding/nonwetting agent; and an effective amount of a catalyst such as at least one of silver, platinum or silver mercury alloy.

In the process of this invention, the catalytic active material components are mixed with deionized water to form a paste. The paste is then spread over and through the thin metal fiber current collector, without causing any compacting of the current collector. It is very important that the current collector have a thickness of between about 0.005 inch to about 0.050 inch. Over 0.050 inch, it will be difficult to completely paste, impregnate and encapsulate the current collector with the active battery material without excessive pressure, which would compress the fiber structure of the current collector to the point where intimate internal contact is impossible, and a large number of voids within the fiber structure will result. This will, disadvantageously, provide the most voids at the position where it is most desirable to have active material. Under 0.005 inch, the fiber metal plaque is too difficult to work with.

After pasting, substantially all excess active material is removed from the sides of the loaded plaques, generally by scraping. This produces a plurality of uncompacted plaques, loaded at between about 45% to about 95% with active material, intimately contacting and surrounding the current collector, and containing substantially no, or a very minimum residue of a separate, attached active material layer. No pressing is used in the loading step so that the plaque is uncompacted and the active material is free to fill all the void volume.

The loaded plaques are then stacked on top of each other and subjected to flat-bed pressing at a temperature between about 200° C. and about 350° C., at a pressure of between about 0.25 ton per square inch to about 7.5 tons per square inch, for an effective time period, to ensure complete consolidation and lamination, without substantial compaction, generally 1 minute to about 20 minutes. This structure will consist of a plurality of electrical conductor layers with interdisposed active material layers, all in intimate contact. The consolidated hydrophilic section is then bonded to the hydrophobic layer generally by roll laminating at an air pressure of between about 25 psi. and about 500 psi, to provide an air electrode.

Figure 3:
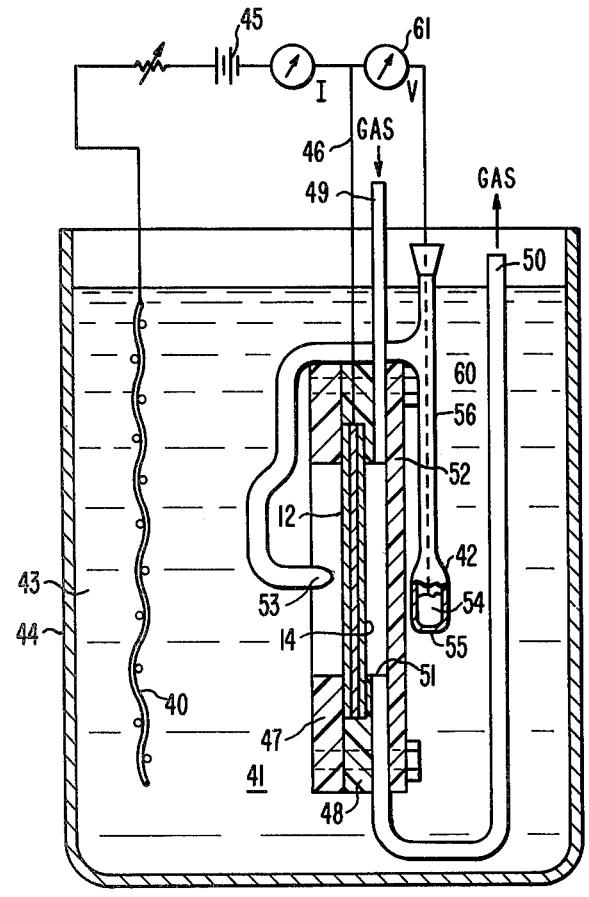
FIG. 3 shows an electrode testing device.

The air electrode shown in FIG. 3 as 12 was tested against an inert counter-electrode 40 in a driven circuit, such as shown in FIG. 3 for which purpose it was placed in an electrode holder 41, in conjunction with a reference electrode 42. As shown, the assembly of the electrode holder 41 and the electrode 12 is immersed in an electrolyte 43, such as aqueous KOH, contained in a container 44. A counter electrode 40, composed of a metal mesh or film such as platinum or nickel, is likewise immersed in the electrolyte 43. The cell including the electrodes 12 and 40 in the electrolyte 43 is driven by a 12 volt battery 45 for testing with the electrode 12 connected to the circuit by a lead wire 46, which extends between the interfaces of the frame member 47 and the portions 48, and which is connected to the upper end of the grid conductor 15. The electorde holder 41 is provided with an inlet tube 49 and an outlet tube 50 which communicates with the portion of the opening 51 between the plate portion 52 and the electrode 12, whereby the active gas such as oxygen is in contact with the hydrophobic layer 14.

The reference electrode 42 is used in conjunction with a Luggin capillary having an opening 53 which is located two millimeters from the surface of the electrode 12 in order to measure the potential of the electrode against a point in the electrolyte located as closely as possible to the electrode 12. The electrode 42 includes a mercury/mercury oxide mixture 54 located in a glass bulb 55 that communicates via an inverted U-shaped glass tube 56 with the Luggin capillary opening 53 on the electrolyte side of the electrode 12. The tube 56 is filled with electrolyte 43. The tube 56 is U-shaped to facilitate attachment of the electrode 42 and the electrode holder 41. A platinum wire 60 leads from the Hg/HgO mixture 54 to one side of a high impedance voltmeter 61, the other side of which is connected to the electrode 12. When air is used as an active gas and the electrolyte is alkaline (KOH), the air before entering the device may be scrubbed by passing it through an alkaline solid absorbent or an alkaline solution. A detailed description of this tester is provided in the aforementioned U.S. Pat. No. 3,930,094.

The following nonlimiting examples are illustrative of various air electrodes formed using a plurality of separate hydrophilic sheets as set forth above.

EXAMPLE 1

Bifunctional air electrodes were fabricated comprising active material loaded fiber metal plaques and a hydrophobic mat. Diffusion bonded, 94% porous, nickel fiber plaques, having a 75 sq. cm. (9.4 cm.×8.0 cm.) area and various thicknesses ranging from about 0.012 inch to 0.045 inch each, were used as current collectors. Each ply had its own dense conduction bus and attached electrical lead tab. The electrical conductor matrix comprised smooth nickel fibers bonded by interdiffusion of atoms across fiber interfaces, providing large pore volumes free of metallic protrusions and melt globules.

Each plaque was wet paste loaded with catalytic active material. The active material consisted of an aqueous mixture of about 90 parts of acetylene carbon black particles, about 36 parts of finely divided fluorinated ethylene propylene particles, 32 parts of fibrillated polytetrafluoroethylene polythetrafluoroethylene binder, about 30 parts of WC coated with 12 wt.% Co and about 30 parts of $Ag(NO)_3$.

A single ply plaque (cell #1) was loaded to about 35% with the catalytic paste. Multi-ply plaques (cells #2, 3 and 4) were loaded to about 80% to 85% with the catalytic paste, i.e., about 80% to 85% of the void volume within the plaque was filled. All the loaded plaques were scraped to insure that there was an absolute minimum of extra active material attached to the outside of the plaques. The weight ratio of catalytic active material:plaque collector was 0.266:1 for the single ply plaque and over 0.6:1 for the multi-ply plaques. The loaded plaques were then hot bed pressed at 300° C. and 1.5 tons/sq. inch for 10 minutes to provide a pressed single ply plaque and three laminated multi-ply consolidated hydrophilic sections. An attempt to peel the multi-ply electrodes apart revealed that an excellent bond had been achieved, without any substantial compression of the plaque structure.

The hydrophilic section was then roll laminated with a hydrophobic sheet of polytetrafluoroethylene about 20 mils thick, at about 25 psi air cylinder pressure and 190° C. This air electrode was operated as a half cell against a nickel counter electrode as described hereinabove and illustrated in FIG. 3 of the drawings. It was then charged (oxygen evolution on air electrode) against the nickel counter electrode several times at various currents with no deterioration in performance. The results of the tests are given below in Table 1, for the single ply (control) sample and the multi-ply samples illustrative of this invention:

TABLE 1

| Cell | No. of Plies | Thickness of Each Ply (in.) | Total Plaque Loading (mg/cm$^2$) | Wt. Ratio Active Material:Plaque Current Collector | Life to 30 mV Below Hg/HgO Hrs. (cycles) |
|---|---|---|---|---|---|
| #1059 | 1 | 0.045 | 24 | 0.266:1 | 614 (50) |
| #1171 | 3 | 0.023 | 63 | 0.615:1 | 768 (64) |
| #1172 | 4 | 0.012 | 84 | 1.090:1 | 1272 (106) |
| #1211 | 8 | 0.012 | 200 | 1.130:1 | 1608 (134) |

As shown, the substantially uncompacted, multi-ply electrode plaques, especially those having 4 and 8 plies, and catalytic active material:plaque wt. ratios over 1.0:1, provided outstanding electrode life values. Loaded plaques having 2 plies or 10 to 12 plies and catalytic having active material:plaque wt. ratios of over 0.40:1 would provide life values at least as good as cell 2.

We claim:

1. An electrode, for use in an electrochemical energy cell, comprising: a multi-layer hydrophilic section consisting of at least two, substantially uncompacted, contacting, laminated plaques containing loaded, catalytic active battery material; each of the separate loaded plaques consisting of an integral 75% porous to 95% porous metal current collector surrounded by catalytic active material and having between about 45% to about 95% of the pore volume within the plaque structure filled with the catalytic active material after loading, wherein the hydrophilic section does not contain a separate, thick, active material layer attached thereto, and the weight ratio of catalytic active material: plaque current collector in the laminated layers is between 0.40:1 and 2.80:1.

2. The air electrode of claim 1, wherein the hydrophilic section contains from 3 to 8 laminated layers and a hydrophobic layer is bonded to one side of the multilayer laminated hydrophilic section.

3. The air electrode of claim 1, wherein the current collector comprises a material selected from the group consisting of bonded metal fibers, expanded metal, and wire mesh.

4. The air electrode of claim 1, wherein the current collector comprises diffusion bonded metal fibers.

5. The air electrode of claim 1, wherein the active material is the hydrophilic section comprises a carbonaceous material, a binder and a catalyst.

6. The air electrode of claim 1, wherein the active material in the hydrophilic section comprises oxygen absorption/reduction carbon particles, about 0.25 part to about 4 parts of a low oxygen overvoltage material, an effective amount of bonding/nonwetting agent and an effective amount of a catalyst.

7. The air electrode of claim 1, wherein the current collectors comprise diffusion bonded metal fibers and the thickness of each current collector is between about 0.005 inch to about 0.050 inch, with catalytic active sites being within the plaque.

8. The air electrode of claim 1 wherein the thickness of the hydrophilic section is between about 0.010 inch to about 0.150 inch.

9. A metal/air cell comprising a metal electrode selected from the group consisting of iron, zinc, and cadmium and at least one air electrode as set forth in claim 1 spaced apart from said metal electrode and an alkali hydroxide electrolyte in contact with said metal and air electrode.

10. An electrode, for use in electrochemical energy cells, comprising:
A. a multi-layer hydrophilic section having a thickness of between about 0.010 inch to about 0.150 inch, consisting of from 3 to 8 substantially uncompacted, contacting, laminated plaques containing loaded, catalytic active battery material primarily within its structure, to provide catalytic active sites within the plaques; each of the separate loaded plaques consisting of an integral, 75% porous to 95% porous, about 0.005 inch to about 0.050 inch thick diffusion bonded metal fiber current collector surrounded by catalytic active material and having between about 45% to about 95% of the pore volume within the plaque structure filled with the catalytic active material, wherein the hydrophilic section does not contain a separate, thick, active material layer attached thereto, and the weight ratio of catalytic active material:plaque current collector in the laminated layers is between 0.40:1 and 2.80:1, and
B. a hydrophobic layer bonded to the multi-layer hydrophilic section.

11. The air electrode of claim 10, wherein the active material in the hydrophilic section comprises a carbonaceous material, a binder and a catalyst.

12. The air electrode of claim 10, wherein the active material in the hydrophilic section comprises oxygen absorption/reduction carbon particles, about 0.25 part to about 4 parts of a low oxygen overvoltage material, an effective amount of bonding/nonwetting agent and an effective amount of a catalyst.

13. A metal/air cell comprising a metal electrode selected from the group consisting of iron, zinc, and cadmium and at least one air electrode as set forth in claim 10 spaced apart from said metal electrode and an alkali hydroxide electrode in contact with said metal and air electrode.

* * * * *